United States Patent [19]
Leader

[11] 3,822,536
[45] July 9, 1974

[54] GRASS CATCHER
[76] Inventor: Harold P. Leader, Box 325, Helena, Ala. 35080
[22] Filed: May 24, 1973
[21] Appl. No.: 363,421

[52] U.S. Cl. ............................................. 56/202
[51] Int. Cl. ........................................... A01d 35/22
[58] Field of Search ...................... 56/194–206, 56/320.2, 255, 17.5

[56] References Cited
UNITED STATES PATENTS
| | | | |
|---|---|---|---|
| 435,183 | 8/1890 | Latham | 56/200 |
| 661,230 | 11/1900 | Robacker | 56/200 |
| 3,099,123 | 7/1963 | Price | 56/202 |
| 3,143,842 | 8/1964 | Mattson et al. | 56/202 |
| 3,386,234 | 6/1968 | Leader | 56/202 |
| 3,494,116 | 2/1970 | Lempke | 56/202 |
| 3,503,192 | 3/1970 | Berg et al. | 56/202 |
| 3,513,649 | 5/1970 | Berg | 56/202 |

*Primary Examiner*—Russell R. Kinsey
*Attorney, Agent, or Firm*—Sherman Levy

[57] ABSTRACT

A grass and litter catcher for lawn mowers that includes a unit that has sections that are adjustably connected together, and wherein there is provided a filter member in the unit.

2 Claims, 8 Drawing Figures

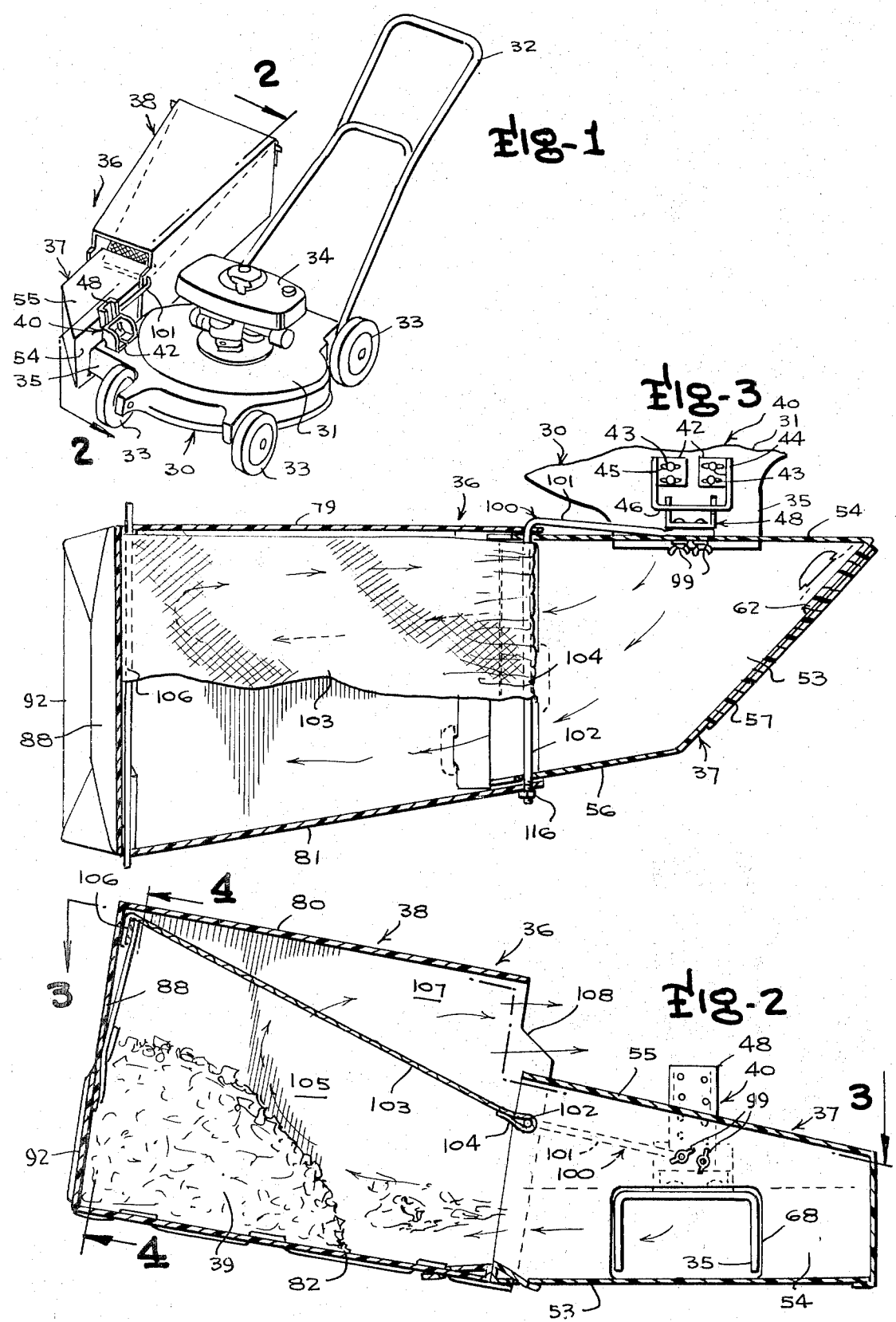

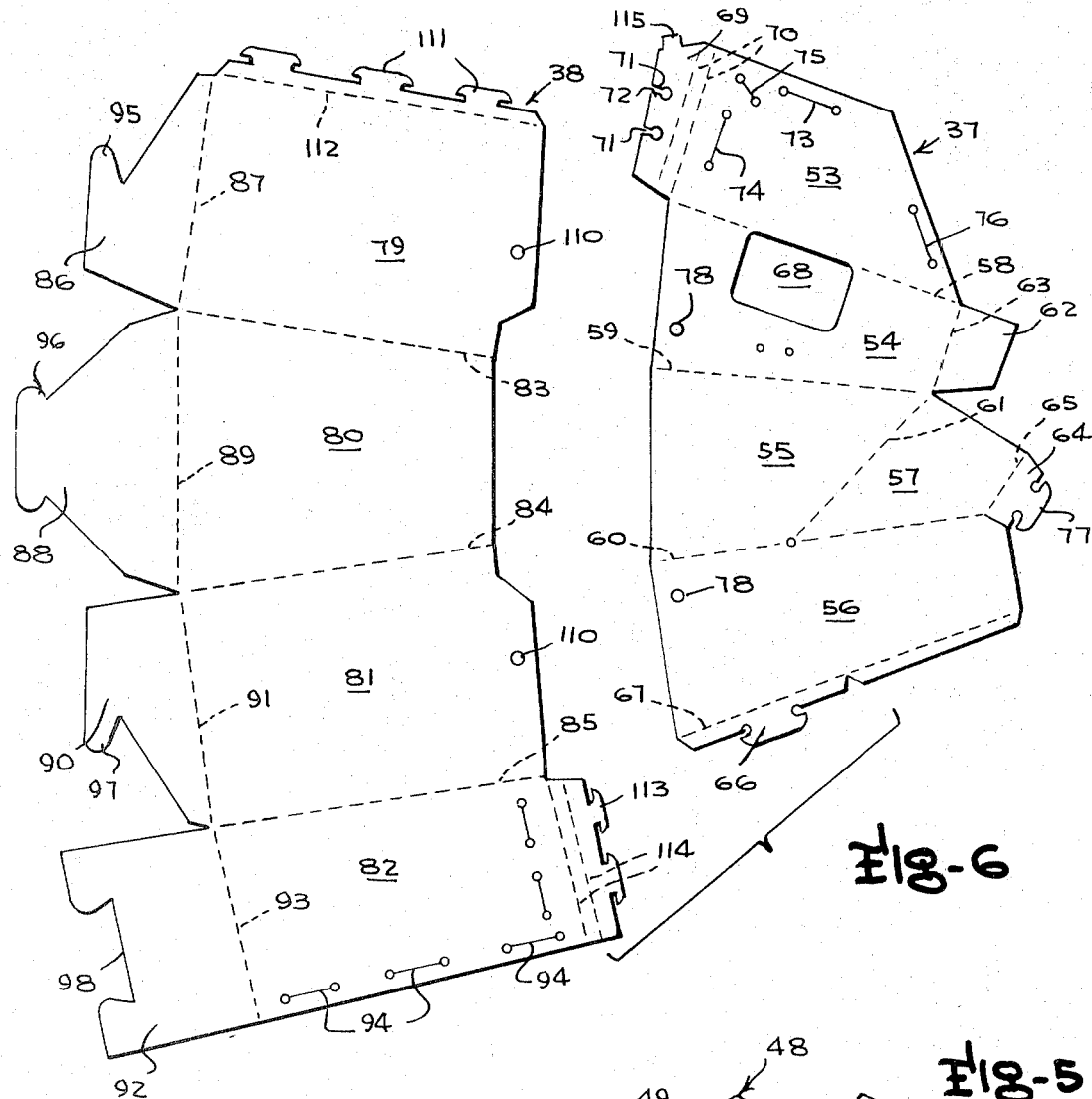
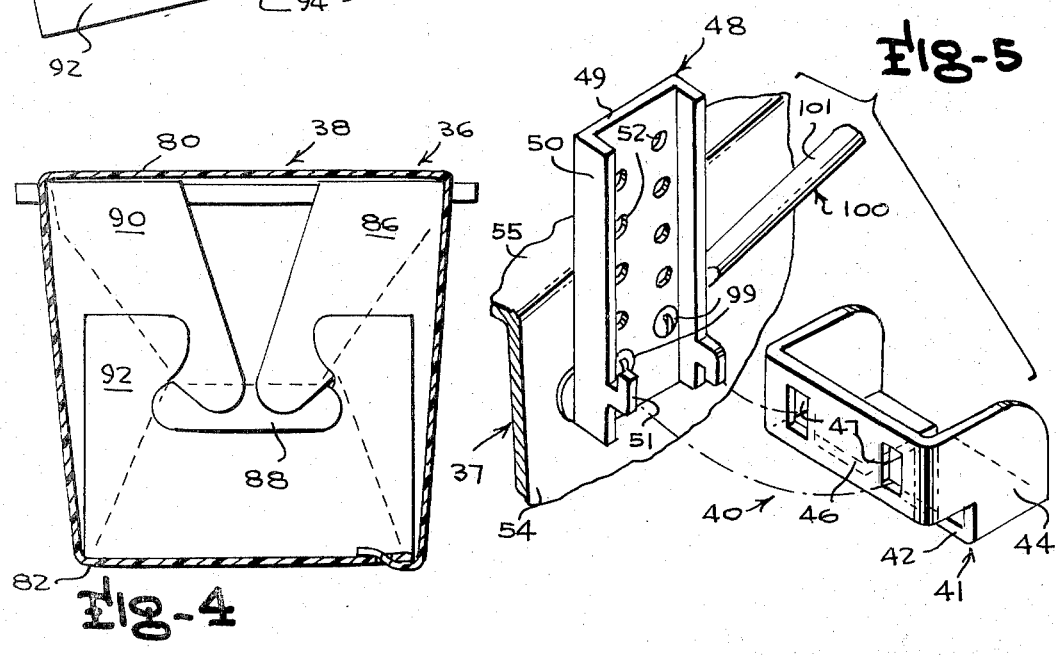

GRASS CATCHER

This invention relates generally to grass and litter catchers for lawn mowers, and more particularly to a grass catcher that is adapted to be mounted on a conventional lawn mower so that grass and the like will be collected or received therein in a highly advantageous manner.

A principal object of the present invention is to provide an improved grass catcher that has increased structural stability as well as important safety features, and wherein the grass catcher can be readily emptied when desired.

A further object is to provide an improved grass catcher that includes a filter member therein and wherein air will be discharged away from the lawn mower operator, and wherein dust particles and the like will be eliminated by the filter material in the rear top portion of the grass catcher.

Still another object is to provide such an improved grass catcher that it can be made without using costly dies, and wherein there is provided a simple and economical means for attaching the grass catcher to the lawn mower.

A still further object of the present invention is to provide a lawn mower attachment that can be used for collecting pine straw, leaves, grass clippings, litter and the like, and wherein the device provides easy handling and convenient maneuverability, and wherein the device can be readily and easily assembled. In addition, the device can be unloaded in seconds, when desired, and the device can be used in areas where bagging grass is needed or desired.

A still further object is to provide such a grass catcher that is economical to manufacture and efficient in operation.

Other objects and advantages of the present invention will become apparent as the following description proceeds.

To the accomplishment of the foregoing and related ends, the invention, then, comprises the features hereinafter fully described and particularly pointed out in the claims, the following description and annexed drawings setting forth in detail certain illustrative embodiments of the invention, there being indicative, however, of but a few of the various ways in which the principles of the invention may be employed.

In said annexed drawings:

FIG. 1 is a perspective view illustrating the grass catcher of the present invention attached to a lawn mower.

FIG. 2 is an enlarged sectional view taken on the line 2—2 of FIG. 1.

FIG. 3 is a sectional view taken on the line 3—3 of FIG. 2.

FIG. 4 is a sectional view taken on the line 4—4 of FIG. 2.

FIG. 5 is an exploded perspective view of the mounting means.

FIG. 6 is a plan view illustrating the pattern or showing certain of the parts in exploded position before folding.

Referring in detail to the drawings, there is shown an improved grass catcher which is an improvement over the grass catcher shown in prior patents such as prior U.S. Pat. Nos. 3,386,234 and 3,374,612.

Figure 8:
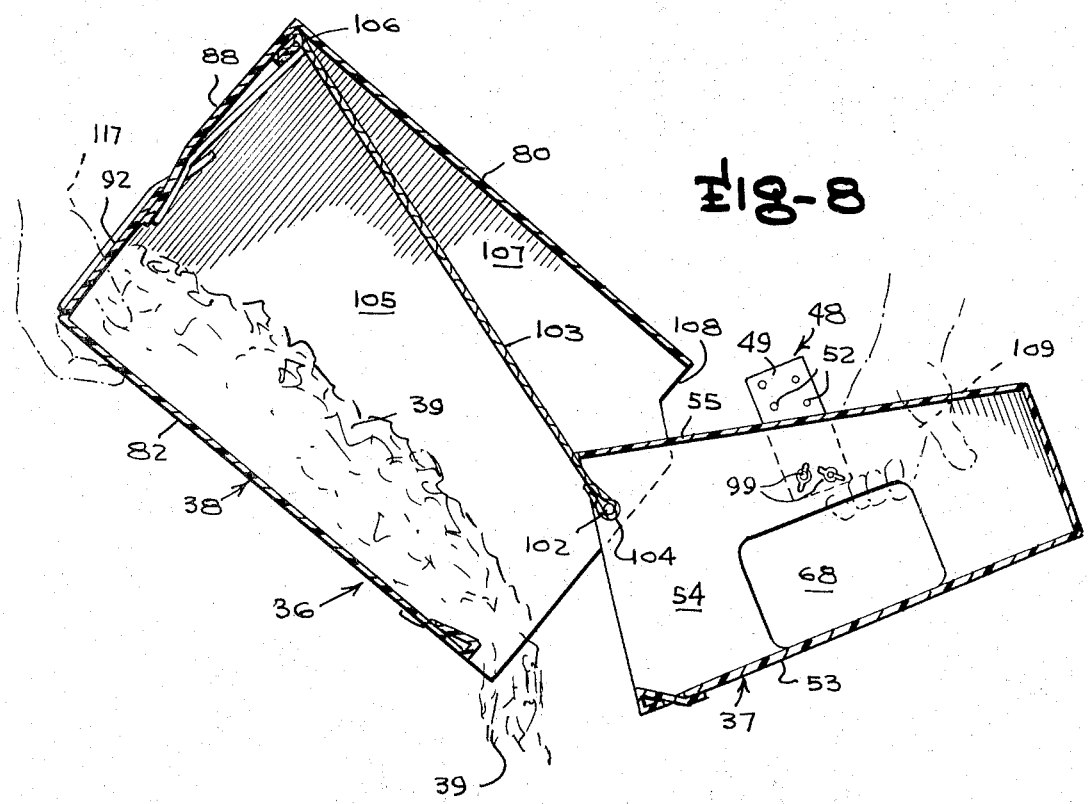
FIG. 8 is a view similar to FIG. 2, but showing the parts in adjusted position as when the grass catcher is being emptied of grass.
Figure 7:
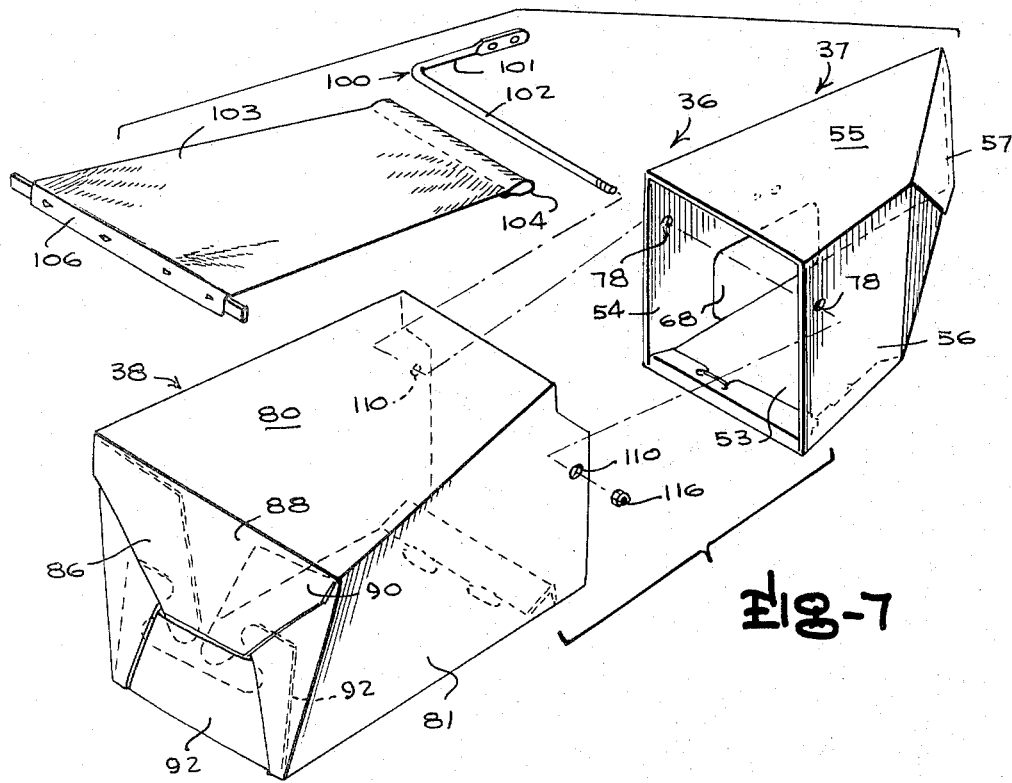
FIG. 7 is an exploded perspective view of the grass catcher.

Referring in detail to the drawings, the numeral 30 indicates a conventional lawn mower that includes a housing or deck 31, handle 32, wheels 33, engine 34, and discharge chute 35. The numeral 36 indicates the improved grass catcher of the present invention that includes first and second members 37 and 38 that are adjustably connected together. Member 38 is a container which receives the grass clippings and member 37 is structure which serves to convey, guide, etc., the grass clippings from the mower discharge chute to said container. In FIG. 8 the numeral 39 indicates grass being emptied from the grass catcher.

In accordance with the present invention, there is provided a mounting means 40 for attaching the grass catcher 36 to the lawn mower 30, and as shown in FIG. 5, the mounting means 40 includes a bracket 41 that has a bottom portion 42 that is provided with slots 45, whereby securing elements such as bolts or screws 43 can extend through the slots 45 and into engagement with the deck 31 of the lawn mower. The bracket 41 further includes spaced parallel side pieces 44 that are inter-connected by a cross piece 46, and the cross piece 46 has spaced apart slots 47 therein. The mounting means 40 further includes a channel member 48 that includes a flat portion 49, and the channel member 48 further includes spaced parallel side flanges 50 that have L-shaped lugs or fingers 51 thereon for selectively engaging slots 47. As shown in FIG. 5, the lugs 51 are oppositely disposed relative to each other to provide the necessary locking action. The portion 49 has a plurality of apertures or openings 52 therein.

As shown in FIG. 6, the first member 37 includes portions 53, 54, 55, and 56. The portions 53 and 54 are supported by fold or crease line 58, and the fold line 59 is arranged between the portions 54 and 55. A fold line 60 is arranged at the junction of the portions 55 and 56, and a fold line or crease line is arranged between the portions 55 and 57. The numeral 66 indicates a flap portion that is connected to the portion 56 adjacent a fold line 67. The fold 61 is arranged at the junction between the portions 55 and 57. The front 62 is connected to the portion 54 along the fold line 63. A flap portion 64 is connected to the portion 57 by a fold line 65. The flap portion 66 is arranged adjacent the fold line 67, as shown in FIG. 6. The numeral 68 indicates an opening that is formed in the portion 54 for a purpose to be later described, when the opening 68 registers with or receives the discharge chute 35 of the lawn mower when the parts are in their assembled position.

As shown in the drawings, a flap portion 69 is connected to the portion 53 by a fold or crease line 70, and the portion 69 has cut-outs or recesses 71 therein that define therebetween a tongue or flap 72. Arranged in the portion 53 are spaced apart grooves or slots 73, 74, 75 and 76 for a purpose to be later described. The numeral 77 indicates a tongue portion on the flap 64. Apertures or openings 78 are formed or provided in the portions 54 and 56.

As shown in FIG. 6, the second member 38 includes sections 79, 80, 81 and 82. The sections 79 and 80 are joined by a fold line 83, the sections 80 and 81 are joined by a fold or crease line 84, and the sections 81 and 82 are separated by a fold or crease line 85. A flap 86 is joined to the sections 79 by a fold line 87, a flap 88 is connected to the section 80 by a fold 89, a flap 90 is connected to the sections 81 by a fold line 91, and a flap 92 is connected to the section 82 by a fold line 93. The flap 86 has a projection 95 thereon, the flap 88 has a projection 96 thereon, and the flap 90 has a projection 97 thereon. The flap 92 has a recessed portion 98 therein, as shown in the drawings.

Securing elements such as bolts or screws 99 extend through certain of the openings 52 and into the member 37, and a rod 100 has a portion 101 connected to the securing elements 99. The rod 100 further includes a transverse portion 102 that has a portion 104 of a filter member 103 connected thereto, as shown in FIG. 2. The numeral 105 indicates a grass collecting zone or area in the grass catcher. The other end of the filter 103 is anchored in place as at 106. The numeral 107 indicates the space above the filter 103 that air can pass therethrough whereby this air can be discharged out through the open end 108. In FIG. 8, the numeral 109 indicates the user's hand gripping the handhold or opening 68 to conveniently empty the grass 39 from the device.

The numeral 110 indicates openings or holes that are provided in the member 38 for the projection therethrough of the portion 102 of the rod 100, when openings 110 register with the openings 78 when the parts are properly assembled. The numeral 111 indicates tongues or flaps or a portion that is joined to the section 79 by a fold line 112, FIG. 6. The numeral 113 indicates tongues that are formed on a portion that is joined to the section 82 by fold or crease lines 114.

From the foregoing, it will be seen that there has been provided an improved grass catcher, and in use with the parts arranged as shown in the drawings, the grass catcher 36 of the present invention can be readily attached to a conventional lawn mower, such as the power operated lawn mower 30.

Initially, the members 37 and 38 may be formed as shown in FIG. 6. Then, when it is desired to assemble the device, a member such as the member 37 will have its portions 53, 54, 55, 56 and 57, as well as the other associated parts, folded along the respective crease or fold lines so that the completed unit 36 is provided, which has a hollow construction. Each of the units or members 37 and 38 has a generally one piece self supporting, non-internally or externally braced construction, and the various flaps or tongues are adapted to interfit in the respective slots or other parts so that the units will be maintained in their proper assembled position.

Thus, the tongue 66 is adapted to be snugly received in the groove or slot 73, while the tongue 77 is adapted to be received in the slot 76. The tongue 72 will be received in the slot 74, and the tongue 115 will be received in the slot 75 so that the parts will inter-fit and lock in the proper manner.

Similarly, when forming the unit 38, the portions 86, 88, 90 and 92 are adapted to be inter-folded and inter-fitted, and wherein the tongues 111 are snugly and firmly received in the slots 94 so that a completed unit 38 can be formed by folding the sections or portions along their respective crease or fold lines.

The rod 100 is adapted to have its transverse portion 102 extended through the registered openings 110 and 78, and the end portion 106 of the filter 103 is held in place as shown in the drawings. The other end portion 104 of the filter cloth 103 is mounted on the portion 102 of the rod. The portion 101 of the rod 100 is held in place by means of securing elements 99.

With the parts arranged as shown in the drawings, and in particular as shown in FIGS. 2 and 3, for example, it will be seen that as the engine 34 of the lawn mower is operated, the grass, litter and the like, will be thrown out through the discharge chute 35, then through the opening 68 and into the interior of the unit 37. This mixture of air and grass or cuttings will then enter the zone or chamber 105, and due to the provision of the porous filter member 103, the air can pass upwardly through the filter 103 from the zone 105 to the zone 107, and this air can then be discharged out through the open space 108. When it is desired to empty the device 36, the parts can be pivoted to a position such as that shown in FIG. 8, so that the grass 39 will empty out from the device into the desired receptacle or the like. As shown in FIG. 8, the opening 68 provides a convenient handhold, so that the user can arrange the hand in engagement therewith to facilitate emptying of the device.

The connection between the parts 48 and 41 is a detachable fitting so that when it is desired to remove the grass catcher from the lawn mower, the lugs 51 can be readily disengaged from the slots 47. However, when the grass catcher is being used on the lawn mower, the inter-fitting lugs 51 and slots 47 will provide a firm anchor for connecting the grass catcher to the lawn mower.

It is to be understood that the parts can be made of any suitable material and in different shapes or sizes, as desired or required.

As shown in the drawings, the front end of the grass catcher 36 is generally closed, and similarly, the rear end of the grass catcher is closed due to the interlocking and interfitting folded flaps or tongues. However, there is provided the opening 108 which permits air to discharge thereto in the desired direction. A fastener or nut 116 may be arranged in threaded engagement with the portion 102 of rod 100 for maintaining the rod in its proper assembled position.

In FIG. 8, the numeral 117 indicates on eof the user's hands that can grip an end of the device, while the other hand 109 is gripping in the vicinity of the opening 68.

As illustrated in the drawings, instead of the air blowing out through the rear of the grass catcher, the air discharges out through the opening 108 in the middle of the unit. With the present invention, it is not necessary to attach a grass catcher bag to a lawn mower, since the grass will be collected in the device of the present invention, and subsequently, this grass can be emptied into any desired location or receptacle.

It is to be understood that the particular embodiments of the invention described herein are merely illustrative of the underlying principles involved, and numerous other arrangements, modifications and adaptions may be conceived without departing from the spirit and scope of the invention.

I claim:

1. In a grass catcher for a lawn mower of the type that includes an engine and a deck, a mounting means comprising a bracket affixed to said deck, said bracket including a cross piece that has spaced apart slots therein, a channel member having spaced apart lugs for engaging the slots in said bracket, said grass catcher including a first member connected to said channel members and having an opening therein for receiving the lawn mower discharge chute, said first member is adapted to grass clippings away from said chute, a second member telescopically associated with and operatively connected to said first member, a rod operatively connected to said first member and having a transverse portion extending through registering openings in telescopically related portions of said first and second members, and a rearwardly extending filter in said second member and having a forward portion mounted on said transverse rod portion, said filter permitting air to pass therethrough and out through an opening in said second member but preventing grass from passing therethrough.

2. In a grass catcher as set forth in claim 1 wherein said first and second members each include a plurality of portions inter-connected by fold lines, inter-engaging flaps, tongues and slots for maintaining the members in their assembled position.

* * * * *